United States Patent [19]

Parr

[11] Patent Number: 5,795,518
[45] Date of Patent: Aug. 18, 1998

[54] PROCESS FOR PRODUCING SEALING RINGS FROM EXPANDABLE GRAPHITE

[75] Inventor: Helmut Parr, Neudorf, Austria

[73] Assignee: Klinger AG, Zug, Switzerland

[21] Appl. No.: 769,864

[22] Filed: Dec. 19, 1996

[30] Foreign Application Priority Data

Dec. 20, 1995 [DE] Germany ............ 195 47 711.1

[51] Int. Cl.$^6$ ............................................. B32B 3/26
[52] U.S. Cl. ............... 264/134; 264/122; 264/127; 264/130; 264/131; 264/440; 427/457; 427/458; 427/475; 521/915
[58] Field of Search ............... 264/122, 127, 264/130, 131, 134, 439, 440; 427/457, 458, 475; 521/915

[56] References Cited

U.S. PATENT DOCUMENTS

| 4,042,747 | 8/1977 | Breton et al. | 428/323 |
| 5,452,904 | 9/1995 | Huber et al. | 277/123 |

FOREIGN PATENT DOCUMENTS

| 0 027 535 | 10/1980 | European Pat. Off. . |
| 0 334 589 | 9/1989 | European Pat. Off. . |
| 0 388 481 | 9/1990 | European Pat. Off. . |
| 0 585 783 A1 | 8/1992 | European Pat. Off. . |
| 24 41 602 | 4/1976 | Germany . |
| 29 42 598 C2 | 7/1987 | Germany . |
| 41 25 647 A1 | 2/1993 | Germany . |
| 42 28 073 A1 | 3/1994 | Germany . |

OTHER PUBLICATIONS

European Search Report for EP 96 11 9423 dated Apr. 7, 1997.

*Primary Examiner*—Jeffrey Stucker
*Attorney, Agent, or Firm*—Alix, Yale & Ristas, LLP

[57] ABSTRACT

Expanded graphite sealing rings having particles of PTFE captured at least in a surface layer are disclosed. The sealing rings are produced by impregnating porous rings, cut from a sheet of low density expanded graphite, with a PTFE dispersion and then compressing the rings to a desired final density. Impregnation is accomplished in the presence of an electric field.

16 Claims, 1 Drawing Sheet

5,795,518

PROCESS FOR PRODUCING SEALING RINGS FROM EXPANDABLE GRAPHITE

BACKGROUND OF THE INVENTION

(1) Field of the Invention

The present invention relates to providing a fluid-tight seal between a pair of relatively movable members and, particularly, to a seal ring comprised of expanded graphite and having an improved service life. More specifically, this invention is directed to a process for producing sealing rings comprised primarily of expanded graphite and, especially, to such a manufacturing process wherein the graphite sealing ring is impregnated with a material having a co-efficient of friction which is lower than that of graphite. Accordingly, the general objects of the present invention are to provide novel and improved articles and methods of such character.

(2) Description of the Prior Art

Sealing rings comprised of expanded graphite are, of course, well known in the art. When such sealing rings are employed between a pair of relatively movable members, for example when used as "glands", the inner or outer circumferential surface of the ring will be subjected to high frictional forces. While expanded graphite sealing rings are known for their favorable properties, such as constant elasticity over a wide temperature range, in the absence of moisture such seals experience a relatively high wear rate, and thus premature failure, when subjected to frictional forces. Attempts to improve the wear characteristics of expanded graphite sealing rings have included the provision, at least on one end face of the ring, of an additional ring of a self-lubricating material such as polytetrafluoroethylene (PTFE). In theory, PTFE particles from such an additional ring will be distributed over the sealing face of the adjacent graphite ring. Additionally, the PTFE ring may serve as a "stripping ring" to remove graphite particles which would otherwise become adhered to the sealing face of the expanded graphite seal ring. In actual practice, however, the addition of a ring of PTFE is of limited benefit because of the well-known temperature limitation of PTFE. Thus, even if the addition of a PTFE stripping ring would offer the reduced friction which is theoretically possible, such a multi-layer sealing ring would have limited utility because it could not be employed in high temperature environments.

SUMMARY OF THE INVENTION

The present invention overcomes the above-briefly discussed and other deficiencies and disadvantages of the prior art by providing novel and improved seal rings characterized by improved resistance to friction induced wear. The invention also encompasses methods for the manufacture of such improved seal rings. In accordance with the invention, an expanded graphite sealing ring is impregnated with a low friction material, preferably PTFE, during an intermediate stage of the manufacturing process. As a result, PTFE particles will be distributed at least over the surface of the sealing ring which is subjected to the sliding movement of a member with which the ring cooperates. The PTFE particles have a size in the μm range and, preferably, an average particle size in the range of 2–10 μm. These PTFE particles are effective over the entire sliding face of the seal and, because of their small size and intimate contact with the graphite, do not flow away even at relatively high operating temperatures.

In accordance with the invention, the particles of the additive having the low co-efficient of friction, i.e., the PTFE particles, are well anchored to the sliding face of the seal. This objective is achieved by initially producing a porous sealing ring comprised of expanded graphite having a pre-determined initial density. The porous expanded graphite ring is then impregnated with a PTFE dispersion, dried and compressed to a desired final density. The step of impregnating the porous ring with the PTFE dispersion is performed in the presence of an electric field. Accordingly, the particles of the low-friction material are attracted to the surface of the expanded graphite and are deposited in the pores thereof. These low-friction material particles are thereafter firmly anchored during the compression of the ring to the desired final density. Superficially adhering PTFE particles are also pressed into the surface of the sealing ring during the final compression.

Brief Description of the Drawing

The present invention may be better understood, and its numerous advantages will become apparent to those skilled in the art, by reference to the accompanying drawing which is a graphical representation of the relative performance of a sealing ring in accordance with the present invention.

DESCRIPTION OF THE DISCLOSED EMBODIMENT

Figure 1:
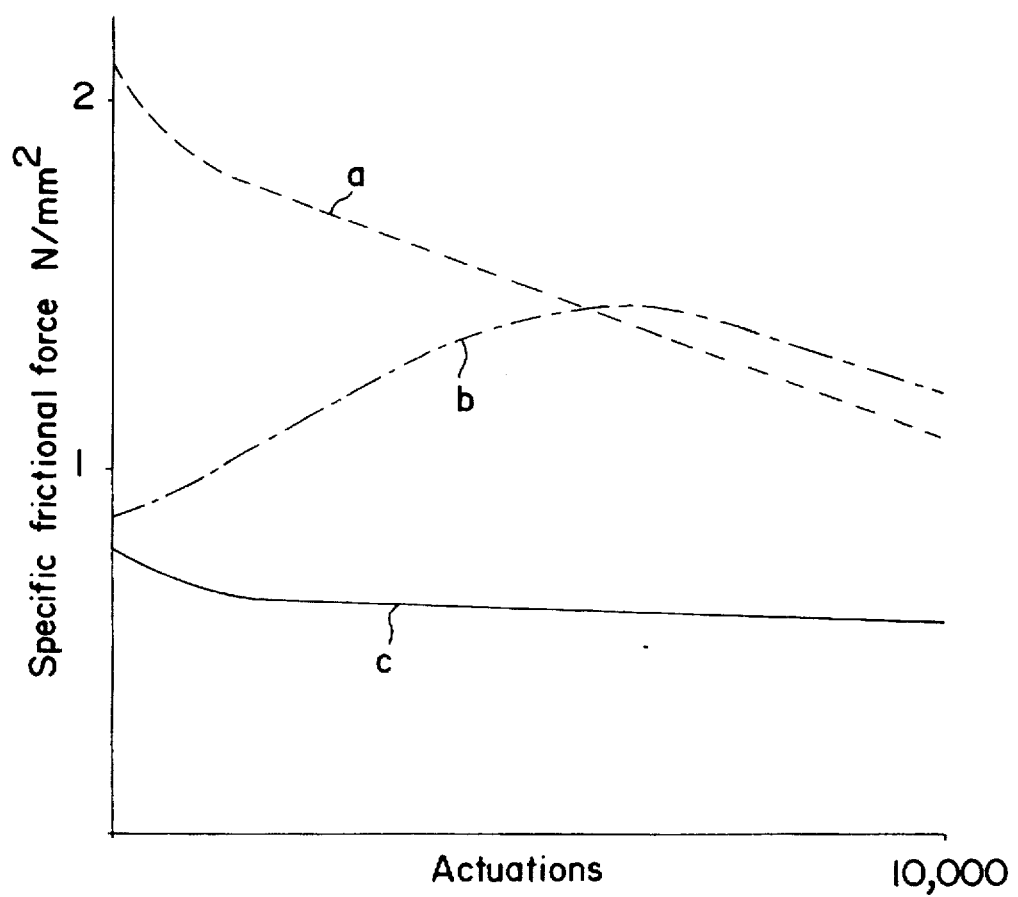

In accordance with the invention, sealing rings are "punched out" of a sheet of expanded graphite, produced by a rolling process, having a pre-determined density. In a sheet of expanded graphite produced by rolling, the graphite particles are generally aligned with their longest dimension substantially in the plane of the sheet, i.e., the graphite particles are oriented so that their longest dimensions are all generally parallel. Accordingly, when rings are cut from the sheet, the graphite is severed perpendicularly with respect to the longer dimension of the particles. This fact, coupled with the relatively low density of the sheet, results in the rings having a relatively high degree of porosity at the cut surfaces, i.e., on the outer and inner circumferential edge surfaces. One of these cut surfaces, of course, will be the surface which functions as the sealing face of the end product.

After having been cut from the "low density" sheet, the porous rings of expanded graphite are impregnated with the low friction material. For this purpose, a PTFE dispersion having a density approximately between 1.3 and 1.4 g/cm$^3$ with PTFE particles having an average size of about 2 to 10 μm is employed. The dispersion is placed in an open topped plastic container which, in turn, is placed in a metal container. The sealing rings to be impregnated are placed in a metal basket which is then immersed in the plastic container which holds PTFE dispersion. A DC voltage is applied between the metal container, which will typically be grounded, and the basket. Since expanded graphite is an electrical conductor, and the rings are in contact with the basket, PTFE particles from the dispersion will apply themselves to the surfaces of the sealing rings including, most importantly, the surfaces of the pores. Restated, the applied field will cause the PTFE particles to penetrate into the cavities in the circumferential edge surfaces of the rings. In practice, it has been found that a DC voltage in the range of about 0.2–4 volts, the actual voltage being dependent on the size and shape of the overall treatment facility, may be employed.

In reductions to practice of the invention, when cut from the rolled sheet of expanded graphite, the sealing rings expediently have a density of not less than 1 g/cm$^3$ and, preferably, a density of about 1.3 g/cm$^3$. Also, the porous sealing rings expediently have an initial density which is not more than 90% of the final density of the rings to be produced.

After the impregnation step, the rings are dried to remove the carrier liquid of the dispersion and then compressed to the desired final density. During compression, which is performed in a closed mold, PTFE particles which have adhered to the surfaces of the pores are captured in the ring. Likewise, PTFE particles adhering to the surfaces of the rings are also pressed into the expanded graphite. The end result is an expanded graphite sealing ring having a density which is preferably not more than about 2 g/cm³ and, on the sealing surfaces, a co-efficient of friction of not more than 0.1.

The drawing is a graphical representation of the operating behavior of hollow-cylindrical sealing rings having outer and inner diameters respectively of 70 and 50 mm and a thickness of 14 mm. All of the test seal rings had a density of 1.7 g/cm³. The drawings depict a test wherein a piston-like part is fitted into the internal bore (50 mm in diameter) of the sealing ring with an oversize of 0.04 mm and reciprocated at a rate of 500 mm/min in a nitrogen atmosphere in a housing maintained under a pressure of 25 N/mm².

Referring to the drawing, the performance of an unimpregnated, expanded graphite sealing ring is represented by curve a. It may be seen that for such an unimpregnated sealing ring, the initial frictional force is relatively high and, because of graphite abrasion, the force constantly decreases. Obviously, as the frictional force decreases, the tightness suffers, i.e., leakage will occur. Curve b represents the case of a completely compressed sealing ring, i.e., a sealing ring of the type represented by curve a, which has been coated with PTFE particles and then subjected to an impregnation step. In the case of such a ring, the frictional force is initially low. However, since the PTFE particles only adhere to the surface, and are thus not captured by the graphite, the frictional force will increase from an initial level and, because of wear, will subsequently fall with a concomitant increase in leakage. Thus, after a relatively modest number of actuations, the performance of the ring of curve b substantially follows that of the unimpregnated ring of curve a. The performance of a sealing ring manufactured in accordance with the invention is represented by curve c. Such a sealing ring has the lowest initial frictional force and this force decreases because of smoothing and transfer of PTFE particles to the sealing face. Most importantly, the decreasing friction of a sealing ring in accordance with the present invention is not achieved at the expense of reduced sealing characteristics, i.e., unlike the sealing rings represented by curves a and b, there is no increase in leakage with time within the parameters of the test.

While a preferred embodiment has been described, various modifications and substitutions may be made thereto without departing from the spirit and scope of the invention.

Accordingly, the present invention has been described by way of illustration and not limitation.

What is claimed is:

1. A process for the production of an expanded graphite sealing ring comprising the steps of:
   Producing a porous sealing ring of pre-determined initial density;
   impregnating the porous sealing ring with a dispersion of polytetrafluoroethylene particles, the impregnation occurring in the presence of an electric field;
   drying the impregnated ring; and
   compressing the dried impregnated ring to a desired final density whereby particles of the low coefficient of friction material are captured in pores in the ring and thereby in part define a sealing surface of the ring.

2. The process of claim 1 wherein the pre-determined initial density of the porous sealing ring is at least 1 g/cm³.

3. The process of claim 1 wherein the predetermined initial density of the porous sealing ring is not greater than 90% of the final density of the sealing ring.

4. The process of claim 1 wherein the step of producing the porous sealing ring comprises cutting the ring from a sheet of expanded graphite.

5. The process of claim 1 wherein the final density of the sealing ring does not exceed 2 g/cm³.

6. The process of claim 1 wherein the dispersion of polytetrafluoroethylene particles has a density of 1.3–1.4 g/cm³.

7. The process of claim 1 wherein the polytetrafluoroethylene particles have an average size of about 2 to about 10 μm.

8. The process of claim 1 wherein the step of compression further causes polytetrafluoroethylene particles adhering to the exterior of the ring to be pressed into a surface of the ring.

9. The process of claim 7 wherein the pre-determined initial density of the porous sealing ring is at least 1 g/cm³.

10. The process of claim 7 wherein the pre-determined initial density of the porous sealing ring is at least 1 g/cm³.

11. The process of claim 2 wherein the pre-determined initial density of the porous sealing ring is not greater than 90% of the final density of the sealing ring.

12. The process of claim 7 wherein the pre-determined initial density of the porous sealing ring is not greater than 90% of the final density of the sealing ring.

13. The process of claim 10 wherein the pre-determined initial density of the porous sealing ring is not greater than 90% of the final density of the sealing ring.

14. The process of claim 3 wherein the final density of the sealing ring does not exceed 2 g/cm³.

15. The process of claim 10 wherein the final density of the sealing ring does not exceed 2 g/cm³.

16. The process of claim 13 wherein the final density of the sealing ring does not exceed 2 g/cm³.

* * * * *